United States Patent [19]

Wang et al.

[11] Patent Number: 5,546,302
[45] Date of Patent: Aug. 13, 1996

[54] POLYNOMIAL CONTROLLER FOR NONLINEAR SYSTEMS

[75] Inventors: Shay-Ping T. Wang, Long Grove; Dan Teng, Wheeling; Bruce E. Stuckman, Algonquin; David A. Hayner, Arlington Heights, all of Ill.

[73] Assignee: Motorola, Inc., Schaumburg, Ill.

[21] Appl. No.: 358,426

[22] Filed: Dec. 19, 1994

[51] Int. Cl.$^6$ ................................................ G05B 13/04
[52] U.S. Cl. ........................ 364/148; 364/149; 364/152; 364/176
[58] Field of Search ........................ 364/148, 149–151, 364/152, 164, 165, 157, 176; 318/561

[56] References Cited

U.S. PATENT DOCUMENTS

| | | | |
|---|---|---|---|
| 4,725,942 | 2/1988 | Osuka | 364/162 X |
| 4,758,943 | 7/1988 | Astrom et al. | 364/149 X |
| 4,797,835 | 1/1989 | Kurami et al. | 364/149 X |
| 5,038,269 | 8/1991 | Grimble et al. | 364/151 X |
| 5,049,796 | 9/1991 | Seraji | 364/192 X |

OTHER PUBLICATIONS

Regressions by Leaps and Bounds by George M. Furnival and Robert W. Wilson, Jr., Technometrics©, vol. 16, No. 4, pp. 499–511, Nov. 1974.

Application of the Leaps and Bounds Algorithm to Nonlinear System Modeling by Norman W. Laursen and Bruce E. Stuckman, presented at ComCon 88 Advances in Communications and Control Systems, Baton Rouge, Louisiana, Oct. 19–21, 1988.

Nonlinear Robust Industrial Robot Control by Shay–Ping Thomas Wang, A Dissertation Presented in Partial Fulfillment of the Requirements for the Degree Doctor of Philosophy, Arizona State University, Dec. 1987.

Primary Examiner—Joseph Ruggiero
Attorney, Agent, or Firm—Bruce E. Stuckman

[57] ABSTRACT

A system polynomial is determined using a plurality of system I/O data, wherein the system polynomial expresses the system output in terms of the system input, and wherein the system polynomial has r' terms including at least one linear term and at least one nonlinear term, the r' terms found using a regression subsets technique. A control polynomial is determined, the control polynomial having at least one cancellation term and at least one control term, the at least one cancellation term calculated to cancel the at least one nonlinear term of the system polynomial, and the at least one control term calculated to control the at least one linear term of the system polynomial. A control output signal is generated based on the control polynomial and the control input signal.

6 Claims, 2 Drawing Sheets

POLYNOMIAL CONTROLLER FOR NONLINEAR SYSTEMS

RELATED INVENTIONS

The present invention is related to the following inventions which are assigned to the same assignee as the present invention:

(1) "Artificial Neuron and Method of Using Same", having Ser. No. 08/076,602, filed Jun. 14, 1993, now U.S. Pat. No. 5,390,136;

(2) "Auto Tuning Controller and Method of Use Therefor" having Ser. No. 08/268,395, filed Jun. 30, 1994;

(3) "Auto-Scaling Controller and Method of Use Therefor" having Ser. No. 08/282,118, filed Jul. 28, 1994; and (4) "Cascade Tuning Controller and Method of Use Therefor" having Ser. No. 08/288,379, filed Aug. 10, 1994.

(5) "Controller for Nonlinear Systems and Method for Use Thereof", Ser. No. 08/358,291, filed currently herewith.

(6) "Method of Programming a Polynomial Processor", Ser. No. 08/358,278, filed currently herewith.

The subject matter of the above-identified related inventions is hereby incorporated by reference hereto into the disclosure of this invention.

FIELD OF THE INVENTION

The present invention relates generally to controllers and, in particular, to controllers for controlling nonlinear systems.

BACKGROUND OF THE INVENTION

Control systems are widely used today for machines, devices and industrial and economic processes. A configuration for a general control system is shown in FIG. 1. The system 10 to be controlled is connected in a feedback configuration with controller 12 which attempts to drive the system output 18 to the value of reference input 14. System output 18 is fed back via feedback path 16 where it is subtracted from reference input 14 to form an error signal 22. This error signal 22 is processed by controller 12 to generate a control output 20 which is in turn fed to the input of system 10. While there are a whole host of different control configurations and structures in use today, one with ordinary skill-in-the-art will realize that FIG. 1 represents the basic building block for these controllers.

Arguably the most difficult class of systems to control are nonlinear systems. Many tools available for linear control do not apply to the control of systems which have significant nonlinearities. In these cases, more sophisticated and more complex controllers are required.

One class of control implementations is the polynomial controller. In the polynomial controller, the control output is a polynomial function of the control input. A control method using a polynomial controller was presented by Stuckman and Laursen, "A Method of Control System Design Using Global Search", *IEEE Transactions on Automatic Controls*, Vol. AC-34, No. 1, January 1989. Furthermore, related inventions (2), (3), and (4) present methods and systems which use polynomial controllers for controlling nonlinear systems based upon control transfer characteristic data.

While yielding effective controls, these control methods do not necessarily guarantee that their overall response will be stable. Therefore, there is a significant need for a controller which can control a nonlinear system in such a fashion that the stability of the system is guaranteed.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DETAILED DESCRIPTION OF A PREFERRED EMBODIMENT

The present invention provides a polynomial controller for nonlinear systems and a method of use thereof. One advantage of the current invention is to provide a controller for a nonlinear system in which stability of the overall control system is guaranteed. A further advantage of the present invention is the provision of a polynomial controller for a nonlinear system wherein the design of the controller is effectuated using conventional linear control techniques. An additional advantage of the present invention is the provision of a method for controlling a system which uses input/output system data to derive a model for the system.

Figure 1:
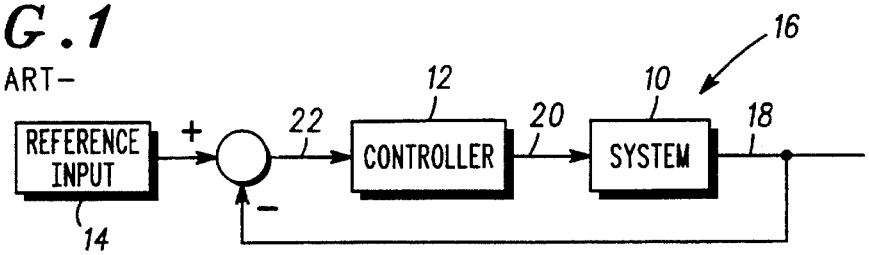
FIG. 1 shows a block diagram representation of a prior art control system configuration.
Figure 2:
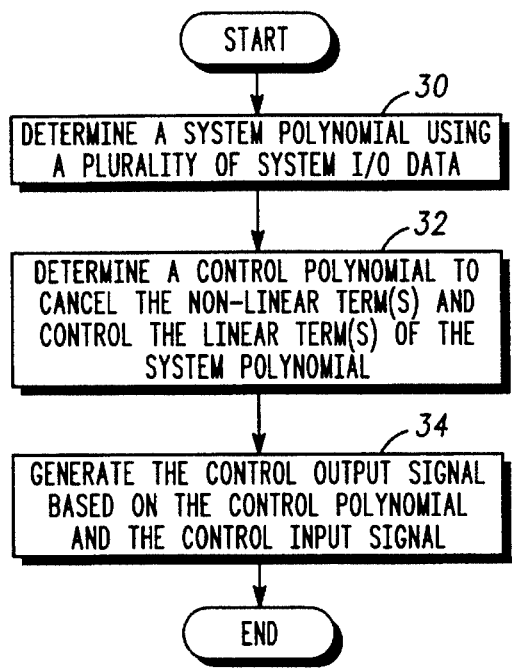
FIG. 2 presents a flowchart representation of a control method in accordance with one embodiment of the present invention.

FIG. 2 presents a flowchart representation of a control method in accordance with one embodiment of the present invention. The method begins in step 30 by determining a system polynomial using a plurality of system input/output (I/O) data. In step 32, a control polynomial is determined which cancels the nonlinear terms in the system polynomial and which controls the linear terms of the system polynomial. In step 34, the control output signal is generated based on the control polynomial and a control input signal.

The system polynomial can be represented in terms of a difference equation for purposes of discrete-time computation as follows:

$$x(k+1)=a_0*x(k)+a_1*x(k-1)+ \ldots +a_n*x(k-n)$$
$$+a_{n+1}*x(k)*x(k-1)+ \ldots +u(k), \quad (1)$$

where $x(k)$ is based on the value of the system output at an kth instant in time (where, for instance, $k=jT$ where j is an integer and T is the sampling period), $a_i$ is the coefficient of the ith term in the equation and $u(k)$ is the system input at the kth instant in time. Depending on the particular control configuration used, x(k) could be proportional to the system output, an error signal depending on some reference value or a combination of both.

The system polynomial of Equation (1) can likewise be represented as follows:

$$= X_1 + X_2 + u(k), \quad (2)$$

where, $$X_1 = a_0 * x(k) + a_1 * x(k-1) + \ldots + a_n * x(k-n) \quad (3)$$

representing the linear terms in the system polynomial, and $$X_2 = a_{n+1} * x(k) * x(k-1) + \ldots \quad (4)$$

representing the nonlinear terms in the system polynomial. One of ordinary skill in the art will recognize that, by this fashion, the operation of the system can be accurately modeled based upon an appropriate choice of the various terms of the model and their corresponding coefficients $a_i$.

Figure 3:
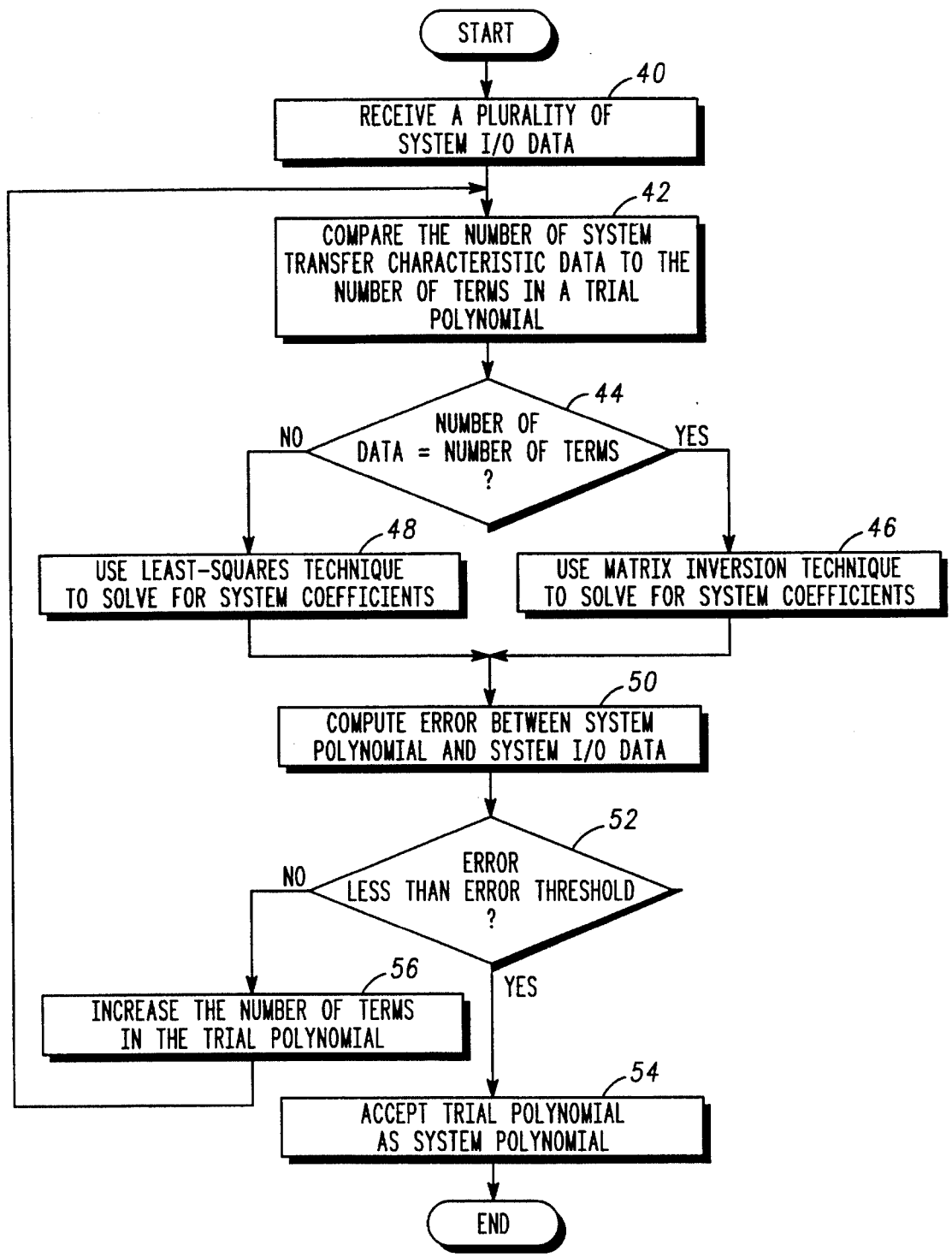
FIG. 3 presents a flowchart representation of a method for implementing step 30 of FIG. 2 in accordance with a preferred embodiment of the present invention.

FIG. 3 presents a flowchart representation of a method for implementing step 30 of FIG. 2 in accordance with a preferred embodiment of the present invention. First, regarding step 40, a plurality of system I/O data which represent the system transfer characteristic are received. Next, regarding step 42, the number of data is compared with the number of terms in a trial system polynomial encompassing the n previous values of the system output x(k), x(k−1), ..., x(k−n) of order m. Thus, the trial system polynomial can be represented by $$x(k+1) = u(k) \sum_{i=1}^{r} a_{i-1} x(k) g_{0i} * x_{(k-1)} g_{1i} * \ldots * x_{(k-n)} g_{ni}, \quad (5)$$

where the maximum value of $g_{0i} + g_{1i} + \ldots$ gni=m and where r is the number of terms in the trial polynomial.

Regarding decision step 44, if the number of data equal the number of polynomial terms, the procedure goes to step 46 which indicates that a matrix inversion technique is used to solve for the value of each system coefficient. If, on the other hand, the number of data is not equal to the number of system coefficients, the procedure goes to step 48, which indicates that a least squares estimation technique is used to solve for the value of each system coefficient. In step 50, the resulting accuracy of the resulting system polynomial is checked using the system I/O data by computing the error between the system I/O data and the system polynomial. Next, regarding decision step 52, if the error is less than an error threshold, the method proceeds to step 54 where the trial polynomial is accepted as the system polynomial and the method ends. If however, the error is not less than the error threshold, the number of terms in the trial polynomial are increased in step 56 and the method proceeds back to step 42 to start again.

While a preferred embodiment is described herein, one with ordinary skill-in-the-art will recognize that other curve fitting techniques, for example, extended least squares, pseudo-inverse, Kalman filtering, maximum likelihood, Bayesian estimation, polynomial splines, and like techniques, could be used to fit the system polynomial to the system I/O data.

Figure 4:
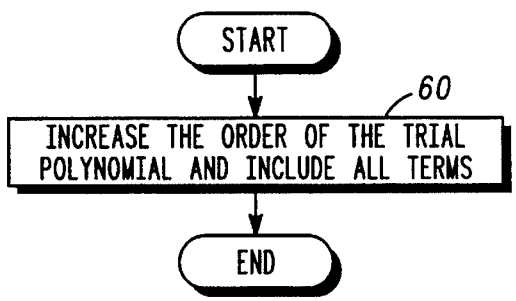
FIG. 4 presents a flowchart representation of a method for determining the terms in the trial polynomial in accordance with one embodiment of the present invention.

FIG. 4 presents a flowchart representation of a method for determining the terms in the trial polynomial in accordance with one embodiment of the present invention. This method can be used to implement step 56 of the method presented in FIG. 3. In this embodiment of the present invention, the trial polynomial has all of the terms which correspond to a general polynomial of order m. Thus, the number of terms r, is given by:

$$r = (n+m+1)!/((n+1)!m!). \quad (6)$$

The number of terms in the trial polynomial are increased by increasing the order of the trial polynomial to m+1 as shown in step 60.

Figure 5:
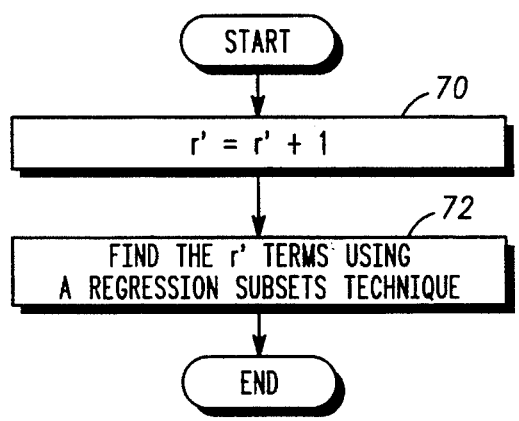
FIG. 5 presents a method for determining the terms in the trial polynomial in accordance with an alternative embodiment of the present invention.

FIG. 5 presents a method for determining the terms in the trial polynomial in accordance with an alternative embodiment of the present invention. This method can also be used to implement step 56 of the method presented in FIG. 3. In this method, the terms in the trial polynomial are determined using a regression subsets technique, therefore, the trial polynomial of order m includes only a subset r' of the total r possible terms. Any number of regression subsets techniques can be used, however, in a preferred embodiment of the present invention, the regression subsets techniques is chosen from the group consisting of: a backward elimination method, a forward selection method, a stepwise selection method, and an optimal regression subsets method. Each of these techniques will be described in further detail in the description which follows.

A backward elimination method begins with the full r-terms of a general mth order polynomial. The r'-term trial polynomial is found by incrementally decreasing the number of terms in the model from r to r' by the following rule. At each step the consequences of removing each term by itself are considered by calculating the resulting error between the system I/O data and the trial polynomial based upon an error criteria such as sum-squared error. The term that, when removed, increases the error the least, is removed from the polynomial.

A forward selection method begins with no terms. The r'-term trial polynomial is found by incrementally increasing the number of the terms from 1 to r' by the following rule. At each step, the consequences of adding each term by itself are considered by calculating the resulting error between the system I/O data and the trial polynomial based upon an error criteria such as sum-squared error. The term that, when added, decreases the error the most, is added to the polynomial.

A stepwise selection method uses a combination of forward selection and backward elimination methods to determine an r'-term trial polynomial. An initial r'-term polynomial is selected using another regression subsets technique such as backward elimination or forward selection. The r' term polynomial is refined by alternatively performing forward selection and backward elimination to selectively add and remove terms to the polynomial. If the same term or. terms are being iteratively added and removed, then the method ends.

Optimal regression subsets methods guarantee that the r'-term trial polynomial which is generated provides the minimum error between the system I/O data and the trial polynomial, based upon a performance index such as sum-squared error. One such optimal regression subsets techniques is an exhaustive approach which forms and compares all r'-term subsets to determine the subset with the minimum error. A less computationally intensive approach is presented by Furnival & Wilson in "Regression by Leaps and Bounds," *Technometrics*, Vol. 16, No. 4, November 1974, hereby incorporated by reference. This leaps and bounds methodology allows the optimum r'-term polynomial to be found based on an evaluation of less than all of the r'-term subsets.

Thus, the method of FIG. 5 begins by incrementally increasing r' as shown in step 70. The r' terms are found using a regression subsets technique as shown in step 72 and described herein. While the incremental increase is shown as a increase in one term, one of ordinary skill in the art will recognize that an incremental increase of any number of terms could likewise be implemented in accordance with the present invention.

The method of controller design used to implement step 32 of the method presented in FIG. 2, can be described with more particularity as follows. In general, the controller can be represented by the following control polynomial:

$$u(k)=b_0*x(k)+b_1*x(k-1)+ \ldots +b_n*x(k-n)+(-X_2). \qquad (7)$$

where u(k) is the control output signal which is used to generate the system input, x(k), x(k−1), . . . , x(k−n) are the sequence of system outputs used as control inputs, and $b_0$, $b_1$, $b_n$ are control coefficients. Notice that control polynomial includes a nonlinear term $X_2$ term, the nonlinear term from the system model. This nonlinear term is provided so as to cancel the like term in the system polynomial, in effect, linearizing the system.

The system can then be controlled by deriving the linear terms of the controller, $b_0*x(k)$, $b_1*x(k-1)$, . . ., $b_n *x(k-n)$ so as to control the linearized system. Since a linear controller is used to control a linear system, any of a wide variety of control methods could be used to derive the values of the control coefficients. These control methods include pole placement methods which map an objective function to desired pole locations, pole-zero cancellation, lead-lag compensation, PID control, modern control, optimal control, adaptive control, etc.

Figure 6:
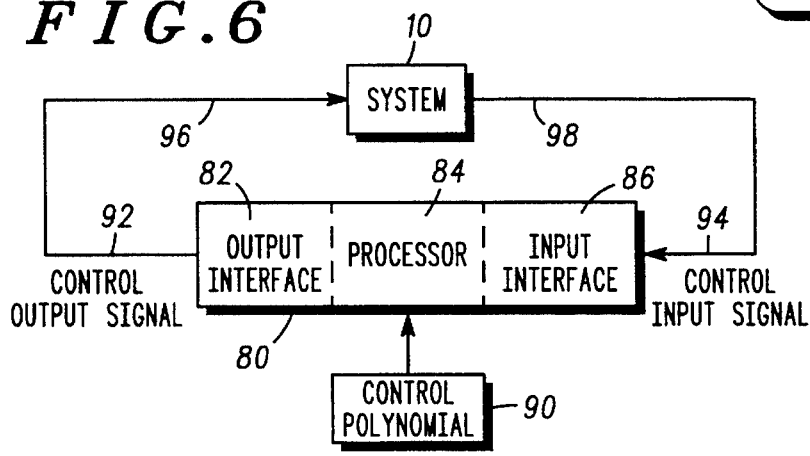
FIG. 6 presents a block diagram representation of a controller used in accordance with the various methods of the present invention.

FIG. 6 presents a block diagram representation of a controller used in accordance with the various methods of the present invention. In particular, step 34 of the method shown in FIG. 2 can be described with more particularity in context of the structure described herein. Controller 80 is provided for controlling a system 10 having a system input 96 and a system output 98. The controller 80 includes an input interface 86 that receives a control input signal 94 based on the system output 98. Output interface 82 of controller 80 generates a control output signal 92 in response to a control output value, the control output signal 92 being coupled to the system input 96.

Controller 80 further includes a processor 84, responsive to the control input signal 94, for generating the control output value based on a control polynomial 90 and the control input signal 94. The control polynomial 90 has a plurality of cancellation terms and a plurality control terms, the plurality of cancellation terms calculated to cancel a plurality of nonlinear terms of a system polynomial, and the plurality of control terms calculated to control a plurality of linear terms of the system polynomial, wherein the system polynomial expresses the system output 98 in terms of the system input 96 and wherein the system polynomial is determined using a plurality of system I/O data.

In a preferred embodiment of the present invention, the processor 84 is implemented using the processing network described in Related Invention (1). Those skilled in the art will recognize however, that other hardware and software configurations are possible for implementing the various methods and systems described herein. In particular, is possible for one skilled in the art to implement these methods and systems in an ASIC, programmable logic array, or other digital circuitry, or using a software programming running on a microprocessor without undue experimentation.

Further, while the system 10 has been described in terms of a scalar input and a scalar output, one of ordinary skill in the art will recognize that the method and system of the present invention would likewise apply to a configuration whereby the system 10 has a vector input, a vector output or both.

It should be obvious to one of ordinary skill in the art that many of the elements used in the various embodiments of the present invention are well suited for implementation on a processor such as a microprocessor, a digital signal processor or a micro controller. Likewise these elements could be performed in hardware by a custom integrated circuit, ASIC, programmable logic array or similar devices.

While specific embodiments of the present invention have been shown and described, it will be apparent to those skilled in the art that the disclosed invention may be modified in numerous ways and may assume many embodiments other than the preferred form specifically set out and described above.

Accordingly, it is intended by the appended claims to cover all modifications of the invention which fall within the true spirit and scope of the invention.

What is claimed is:

1. A controller for controlling a system having a system input and a system output, the controller comprising:

an input interface, that receives a control input signal based on the system output;

an output interface, for generating a control output signal in response to a control output value, the control output signal coupled to the system input; and a processor, responsive to the control input signal, for generating the control output value based on a control polynomial and the control input signal, the control polynomial having a plurality of cancellation terms and a plurality of control terms, the plurality of cancellation terms calculated to cancel a plurality of nonlinear terms of a system polynomial, and the plurality of control terms calculated to control a plurality of linear terms of the system polynomial, wherein the system polynomial expresses the system output in terms of the system input and wherein the system polynomial is determined using a plurality of system I/O data, the system polynomial having r' terms, the r' terms found using a regression subsets technique.

2. The controller of claim 1 wherein the system input includes a plurality of individual system inputs.

3. The controller of claim 1 wherein the system output includes a plurality of system outputs.

4. A controller for controlling a system having a system input and n+1 system outputs, the controller comprising:

an input interface, that receives a control input signal based on the system output;

an output interface, for generating a control output signal in response to a control output value, the control output signal coupled to the system input; and a processor, responsive to the control input signal, for generating the control output value based on a control polynomial and the control input signal, the control polynomial having a plurality of cancellation terms and a plurality of control terms, the plurality of cancellation terms calculated to cancel a plurality of nonlinear terms of a mth order system polynomial, and the plurality of control terms calculated to control a plurality of linear terms of the system polynomial, wherein the system polynomial expresses the n+1 system outputs in terms of the system input and wherein the system polynomial is determined using a plurality of system I/O data, the system polynomial having r terms wherein r=(n+m+1)!/((n+1)!m!).

5. The controller of claim 4 wherein the system input includes a plurality of individual system inputs.

6. The controller of claim 4 wherein the n+1 system outputs represent a sequence of values at n+1 times.

* * * * *